Figures 6, 7:
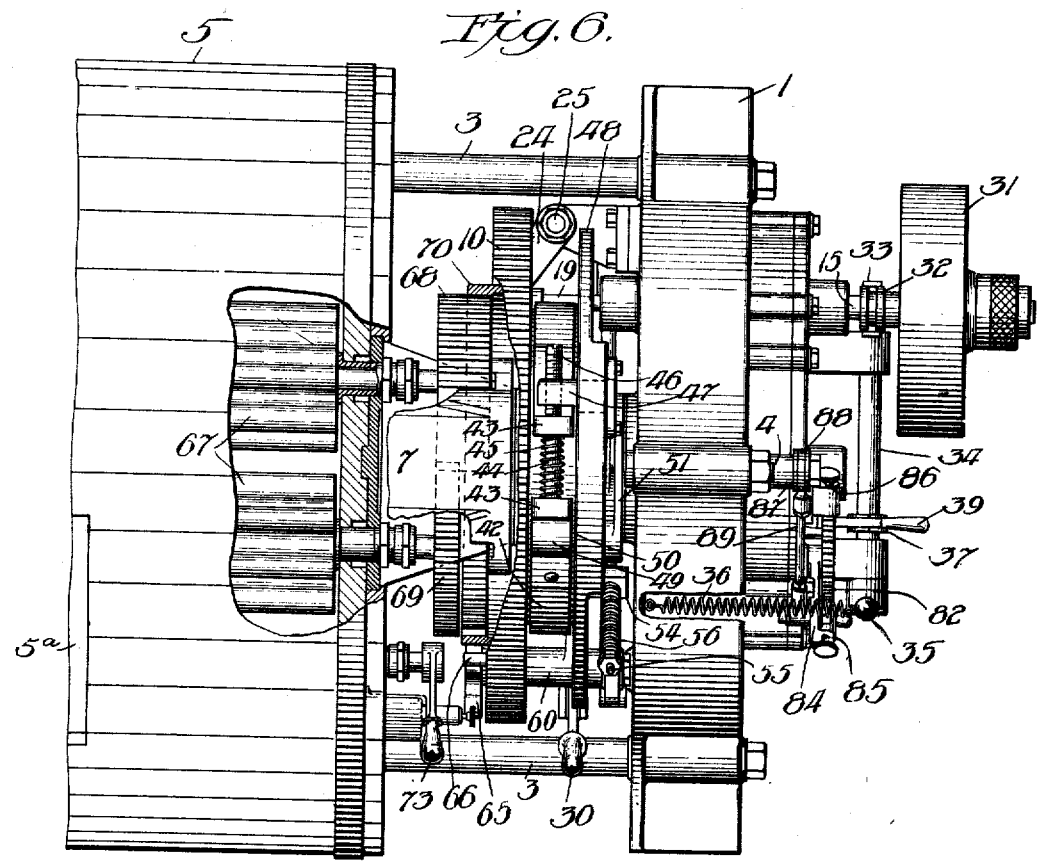

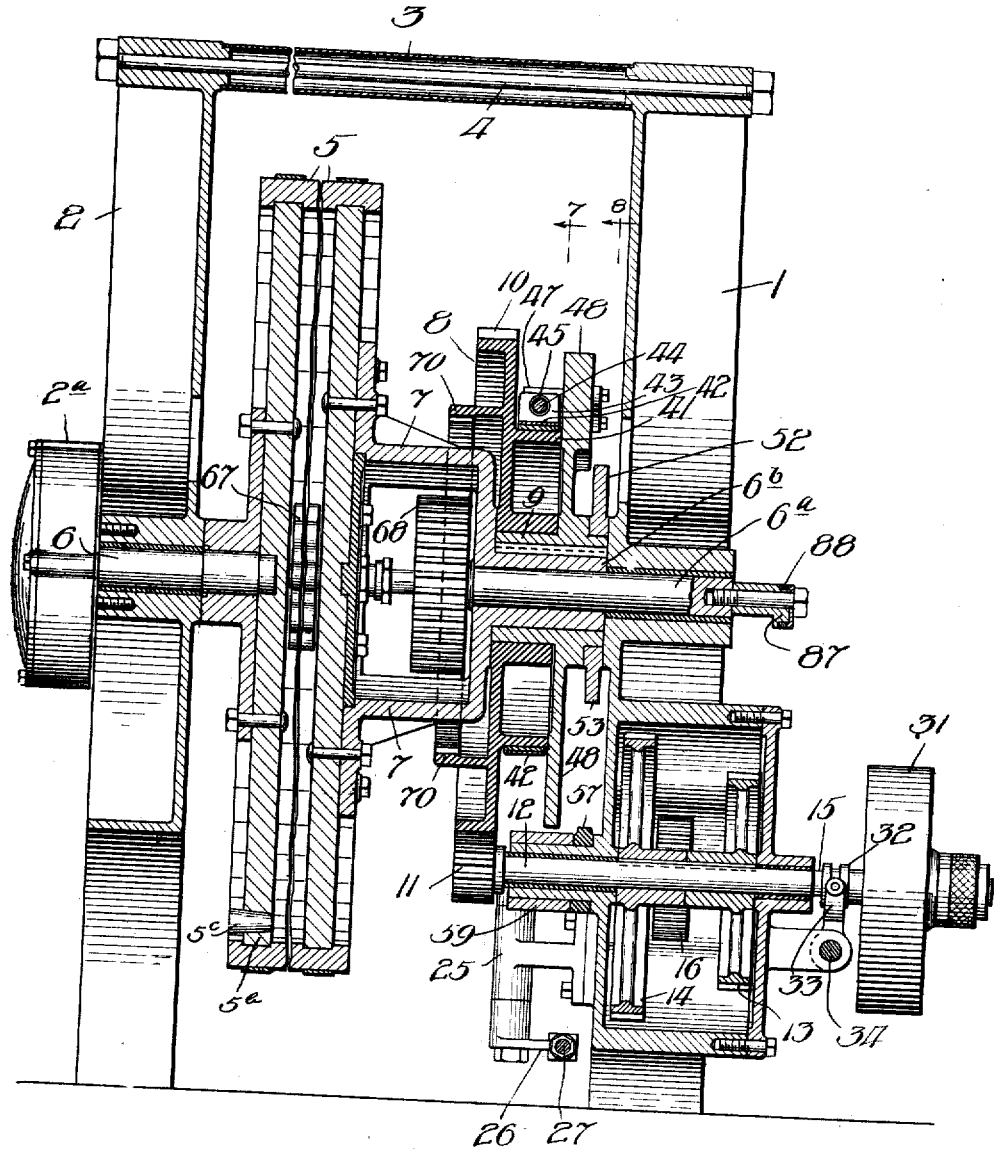

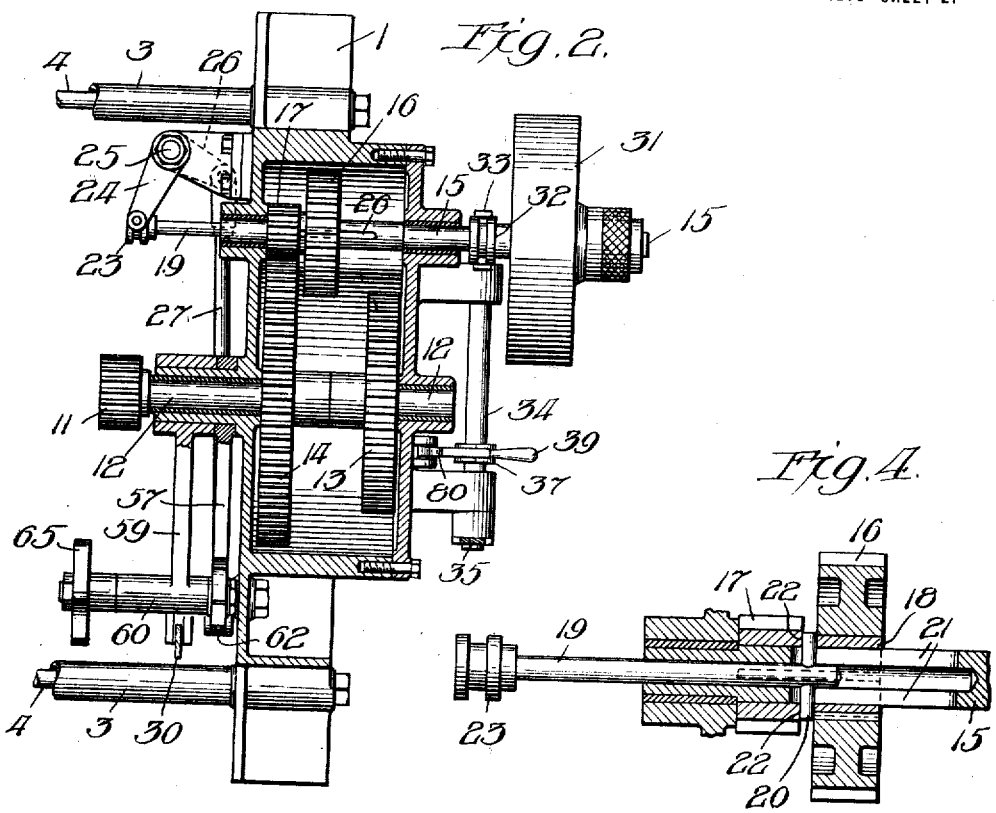
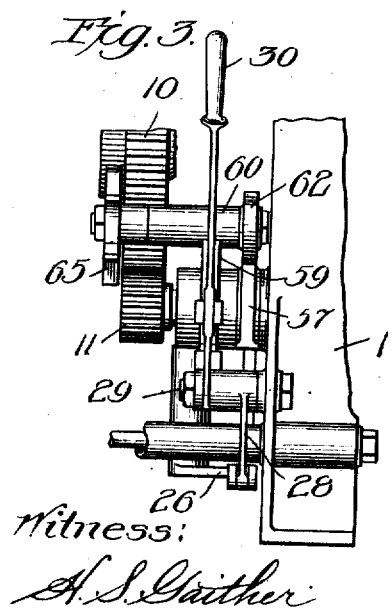

T. L. VALERIUS AND O. LARSEN.
ACTUATING MECHANISM FOR COMBINED CHURNS AND BUTTER WORKERS.
APPLICATION FILED NOV. 28, 1916.

1,335,624.

Patented Mar. 30, 1920.
5 SHEETS—SHEET 3.

Witness:
A. S. Gaither

Inventors:
Theodore L. Valerius
Olaf Larsen
By Miller Chindahl Parker
Attys.

T. L. VALERIUS AND O. LARSEN.
ACTUATING MECHANISM FOR COMBINED CHURNS AND BUTTER WORKERS.
APPLICATION FILED NOV. 28, 1916.
1,335,624.
Patented Mar. 30, 1920.
5 SHEETS—SHEET 4.
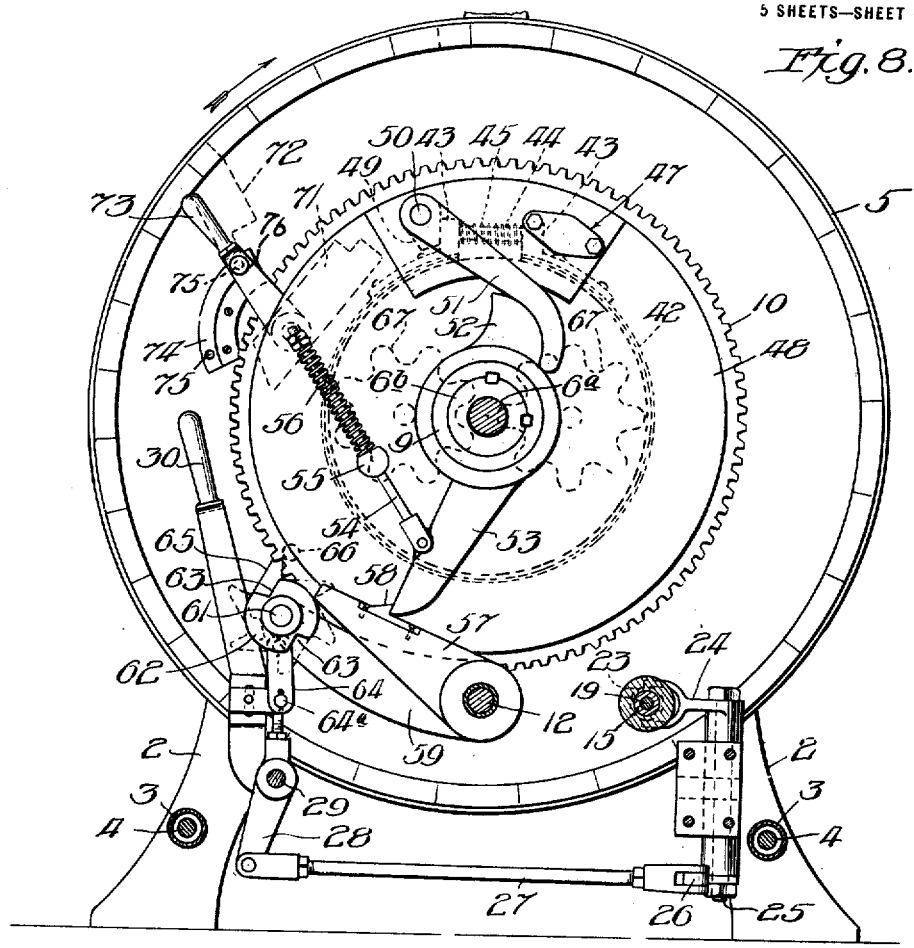

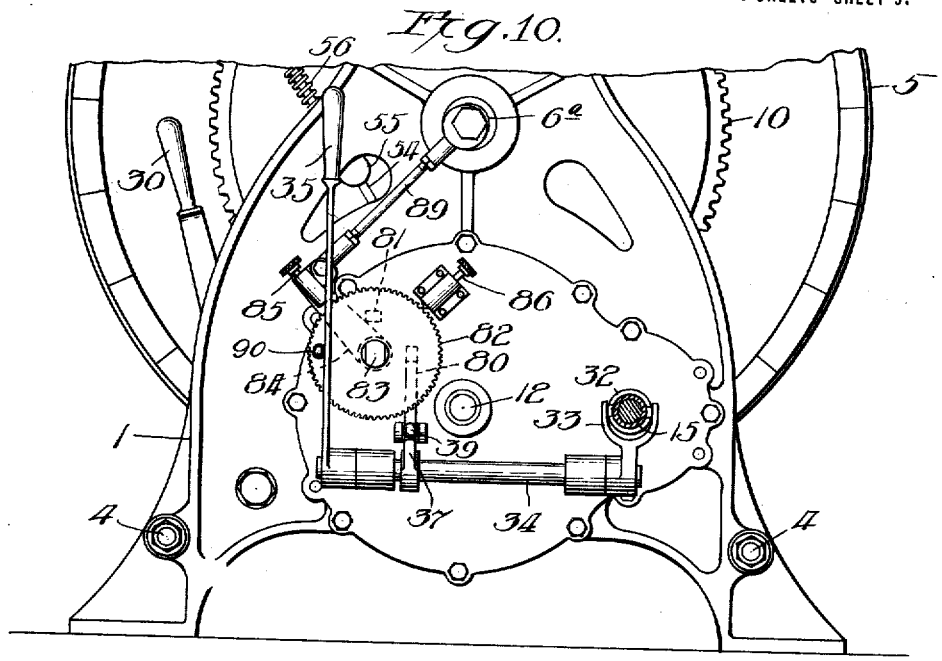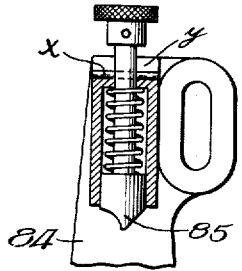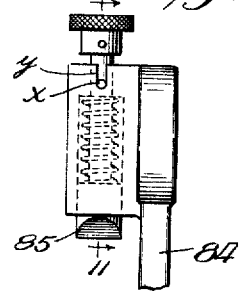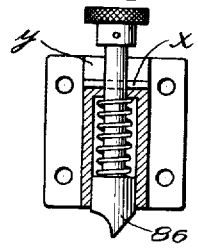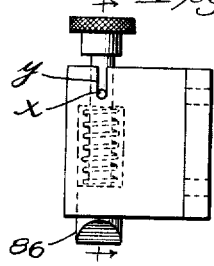

UNITED STATES PATENT OFFICE.

THEODORE L. VALERIUS AND OLAF LARSEN, OF FORT ATKINSON, WISCONSIN, ASSIGNORS TO THE CREAMERY PACKAGE M'F'G COMPANY, OF CHICAGO, ILLINOIS, A CORPORATION OF ILLINOIS.

ACTUATING MECHANISM FOR COMBINED CHURNS AND BUTTER-WORKERS.

1,335,624.

Specification of Letters Patent. Patented Mar. 30, 1920.

Application filed November 28, 1916. Serial No. 133,936.

*To all whom it may concern:*

Be it known that we, THEODORE L. VALERIUS and OLAF LARSEN, citizens of the United States, residing at Fort Atkinson, in the county of Jefferson and State of Wisconsin, have invented certain new and useful Improvements in Actuating Mechanism for Combined Churns and Butter-Workers, of which the following is a specification.

One of the objects of this invention is to provide improved means for imparting to the drum a continuous rotation during the churning operation, and a slower intermittent rotation during the operation of working the butter.

Another object is to improve the means for lifting the butter and discharging it upon the butter-working rolls.

A further object is to provide means for automatically stopping the machine when the butter has been passed through the space between the butter-working rolls the desired number of times.

The invention also relates to the other improvements in combined churns and butter-workers hereinafter set forth.

In the accompanying drawings, Figure 1 is a longitudinal vertical central sectional view of a combined churn and butter worker embodying the features of our invention, parts being broken away to shorten the view. Fig. 2 is a fragmental horizontal sectional view of the driving mechanism. Fig. 3 is a fragmental side elevation showing the hand lever for changing the mechanism from churning to working position and vice versa. Fig. 4 is a fragmental sectional view of a drive shaft and some of the parts mounted therein. Fig. 5 is a view showing the means for holding the driving clutch thrown in and the means for releasing said holding means. Fig. 6 is a fragmental top plan view of the drive end of the machine. Fig. 7 is a view taken in the plane of dotted line 7 of Fig. 1. Fig. 8 is a view taken in the plane of dotted line 8 of Fig. 1. Fig. 9 is a transverse sectional view of the drum, the butter-working rolls and the pivoted shelf. Fig. 10 is a fragmental elevation of the drive end of the machine. Figs. 11 and 12 are fragmental views of a certain ratchet lever, Fig. 11 being sectioned in the plane of dotted line 11—11 of Fig. 12. Figs. 13 and 14 are views of a holding pawl, Fig. 10 being taken in the plane of dotted line 13—13 of Fig. 14.

In the embodiment selected for illustration, the frame of the churn comprises two end standards 1 and 2 of substantially triangular form. The standards are spaced apart by means of three tubes or pipes and are rigidly secured together by tie-rods 4 extending through said tubes.

The drum 5 has one or more openings 5ᵃ (Figs. 6 and 9) through which cream, salt and wash water may be introduced into the drum and through which the worked butter may be removed. The covers for these openings are omitted from the drawings. In the rear end of the drum is a drain opening 5ᵇ (Fig. 1) through which the buttermilk and the wash water may be drawn off. Normally the opening 5ᵇ is closed by a plug 5ᶜ.

The drum 5 is provided with journals or trunnions by means of which it is supported for rotation upon a horizontal axis in the frame. The trunnion 6 (Fig. 1) for the rear end of the drum is rotatably supported in the end standard 2. Any suitable means may be provided to prevent reverse rotation of the drum, as for example, a ratchet mechanism inclosed within a casing 2ᵃ on the end standard 2 and connected with the trunnion 6.

The trunnion 6ᵃ for the forward end of the drum is fixed within a sleeve 6ᵇ, said sleeve being secured to the drum by means of the bracket arms 7. The drum and the butter-working rolls within the drum are rotated by means of a driver 8, said driver being rotatably mounted upon a sleeve 9 which surrounds and is rigidly connected to the sleeve 6ᵇ. The driver 8 has a peripheral series of gear teeth 10 that mesh with a pinion 11 fixed upon a shaft 12, said shaft being supported in the end standard 1. Fixed upon the shaft 12 are the intermediate churning gear 13 and the intermediate working gear 14.

Upon the drive shaft 15 (Fig. 2) carried by the end standard 1 are slidably mounted a churning drive gear 16 and a working drive pinion 17, said pinion and gear being rigidly connected together. Herein, we have shown the gear wheel 16 as keyed upon the hub or sleeve 18 of the pinion 17. Said sleeve is slidable lengthwise of the drive shaft 15. When the churning gear 16 is in mesh with the intermediate gear 13, the working drive pinion 17 is out of mesh with the intermediate working gear 14. It will be seen that the gears 13, 14, 16 and 17 constitute one form of two-speed transmission by means of which the pinion 11 may be driven.

For sliding the gear 16 and pinion 17 into and out of mesh with their respective intermediate gears, we provide a rod 19 (Fig. 4) slidably mounted within the drive shaft 15, said shaft being tubular for a portion of its length. Upon the inner end of the rod 19 is a transverse pin 20 that extends through diametrically-opposite elongated openings 21 in the drive shaft and into openings 22 in the sleeve 18. It will be seen that the gear 16 and pinion 17 are slidable longitudinally of the drive shaft 15, but are caused to rotate therewith by the pin 20. Attached to the outer end of the rod 19 is a peripherally-grooved sleeve 23 which is engaged by a fork 24 (Fig. 2), said fork being pivotally supported upon the end standard 1 at 25. Rigid with the fork 24 is an arm 26 which is connected by means of a link 27 to an arm 28 which is pivoted upon the end standard 1 at 29. The arm 28 is rigid with a hand lever 30, which lever provides means for sliding the gears 16 and the pinion 17 into and out of mesh with their respective intermediate gears 13 and 14.

Loosely mounted on the drive shaft 15 is a drive pulley 31 which is arranged to be frictionally clutched to the drive shaft by means of an ordinary friction clutch element (not shown), said clutch element having attached thereto a peripherally-grooved sleeve 32. Said sleeve is engaged by a fork 33 which is fixed upon a rock shaft 34 supported by the end standard 1. Rigidly mounted on the rock shaft 34 is a hand lever 35 for sliding the friction clutch element into and out of engagement with the drive pulley 31.

A coiled spring 36 (Fig. 6) connected to the hand lever 35 tends to swing the hand lever in the direction to move the friction clutch element out of engagement with the drive pulley 31. Fixed upon the shaft 34 is a projection 37. The spring 36 normally holds the projection 37 pressed against a stop shoulder 38 on a hand lever 39, said hand lever being pivoted to the end standard 1 at 40. When the hand lever 39 is raised the spring 36 will immediately turn the shaft 34 in the direction to draw the friction clutch element away from the drive pulley 31.

It will be seen that the driver 8 may be started and stopped by operating the hand levers 35 and 39, and that the speed of the driver 8 may be changed by operating the hand lever 30.

The means for causing the drum 5 to rotate with the driver 8 comprises a clutch which may be of any suitable type. The form herein shown comprises a friction drum 41 (Figs. 1 and 7) which is rigid with the driver 8, and a band 42 encircling the drum 41. The ends of the band are secured to end-pieces or lugs 43 which are adapted to loosely support a pin 44. Surrounding the pin is a coiled spring 45 that tends to separate the lugs 43 and thus hold the brake band 42 out of gripping engagement with the friction drum 41. One of the lugs 43 stands in contact with an adjustable stop 46 carried by a support 47 that is fixed to a disk 48 which is rigid with the sleeve 9 and hence rigid with the trunnion 6 and the drum 5.

The means for tightening the clutch band 42 into gripping engagement with the friction drum 41 comprises an arm 49 arranged to force one of the lugs 43 toward the other lug, said arm being fixed to a short rock shaft 50 that is journaled in the disk 48. Also fixed upon the shaft 50 is a cam arm 51 arranged to be engaged by a cam 52 rotatably mounted on the sleeve 9. Rigid with the cam 52 is an arm 53. Pivoted to the arm 53 is a rod 54 that passes freely through a stud 55 which is mounted to turn slightly on the disk 48. A coiled spring 56 is compressed between the stud 55 and a nut on the end of the rod 54, said spring tending to move the arm 53 and the cam 52 in the direction to cause the clutch band 42 to be tightened.

When the drum 5 is to be rotated, the spring 56 is permitted to hold the clutch band 42 in gripping engagement with the friction drum 41. When the drum is not to be rotated, the arm 53 is held in such position as to relieve the pressure of the cam 52 against the cam arm 51 and thus allow the spring 45 to expand the clutch band 42 out of gripping engagement with the friction drum 41. The means for thus holding the arm 53 comprises an arm 57 pivotally supported upon the end standard 1, the arm 57 having a locking shoulder 58 against which the end of the arm 53 may be carried in the rotation of the drum 5. The arm 57 is supported for movement to carry the locking shoulder 58 into and out of the path of the arm 53. The means for thus supporting the arm 57 comprises an arm 59 pivotally supported upon the same axis as the arm 57 (see Fig. 2). The arm 59 is provided with a bearing 60 in which is rotatably mounted a shaft 61. Fixed upon one end of the shaft 61 is a cam disk 62 having two diametrically opposite notches 63. The cam disk 62 underlies the arm 57. When the arm 57 lies upon the periphery of the cam disk 62, the locking shoulder 58 is in the path of movement of the arm 53.

When the cam disk 62 is turned so as to bring a notch 63 into register with the arm 57, said arm drops so as to remove the stop shoulder 58 from the path of the arm 53. The arm 59 is connected by means of a link 64 to the hand lever 30. When the drum 5 is to revolve continuously, as in the churning operation, the hand lever 30 is swung downwardly from the position shown in Fig. 8, thereby placing the churning gear 16 in mesh with the intermediate gear 13 and also moving the arms 57 and 59 down out of operative relation to the arm 53. When the drum 5 is to be rotated intermittently, as during the working operation, the hand lever 30 is swung upwardly to the position shown in Fig. 8. When the hand lever is thus swung up, the pivot 64ª of the link swings slightly past a straight line joining the other pivot of the link and the axis of the shaft 29, thereby locking the hand lever in the raised position.

In order that the stop shoulder 58 shall be automatically withdrawn from and placed in the path of the arm 53 during the working operation, we provide means for turning the cam disk 62. This means comprises a star wheel 65 (Figs. 2 and 8) fixed upon the shaft 61. Upon the side of the driver 8 is a pin 66 arranged, in the revolution of the driver, to be carried against one of the fingers or points of the star wheel and thus turn said star wheel and hence the cam disk 62.

The butter-working rolls 67 (Figs. 6 and 9) may be of any suitable form. Herein they are shown as fluted so as to work the butter as the butter passes down between the rolls. Fixed to the shafts of the rolls 67 are spur gear wheels 68 and 69 which are in mesh with each other. The gear wheel 68 is wider than the gear wheel 69 and meshes with an internal gear 70 which forms a part of the driver 8. It will be seen that when the driver 8 is clutched rigidly to the drum 5 by means of the clutch band 42, there will be no relative movement between the gears 68 and 70 and the rolls 67 will be stationary with relation to the drum 5; but when the drum 5 is stationary and the driver 8 is revolving, the rolls 67 will be rotated to work the butter.

Pivotally mounted within the drum 5 is a dasher shelf 71 (Fig. 9). Said shelf is so located within the drum 5 that when the drum is stationary and the rolls 67 are in a horizontal plane, as indicated in Fig. 9, the shelf is at what may be termed the ascending side of the drum and slightly above the rolls. One edge of the shelf is arranged to extend relatively close to the adjacent roll 67. The opposite edge of the shelf is rabbeted so that the shelf may lie flush with a supporting rail 72 rigidly fixed within the drum 5. One of the trunnions of the dasher shelf 71 extends outside the forward head of the drum 5 and has fixed thereto a hand lever 73 (Fig. 8). To secure the dasher shelf 71 in adjusted position with reference to the drum 5, there is provided a locking segment 74 secured to the forward head of the drum 5 and having two holes 75 arranged to be engaged by a spring detent 76 carried by the hand lever 73.

Means are provided for automatically stopping the machine when the drum 5 has made the desired number of revolutions in working the butter. This means will now be described.

It will be remembered that the spring 36 (Fig. 6) tends to turn the shaft 34 in the direction to withdraw the friction clutch element from the drive pulley 31, and that the friction clutch element is normally held in engagement with the drive pulley by means of the hand-lever 39 (Fig. 5), said hand-lever having a locking shoulder 38 that is normally in engagement with a projection 37 on the rock shaft 34. Rigid with the hand-lever 39 is an arm 80 (Fig. 5), the end of which lies in the path of a tripping projection 81 located upon one side of a wheel 82, said wheel being rotatably mounted upon the end standard 1 by means of a stud 83. When the tripping projection 81 is carried into engagement with the end of the arm 80, the hand lever 39 is raised, thus releasing the rock shaft 34 to the action of the spring 36. The wheel 82 is rotated step by step as the drum 5 is revolved during the butter-working operation. The means for rotating the wheel 82 comprises an arm 84 pivotally mounted on the stud 83 and carrying a ratchet-toothed spring plunger 85 adapted to engage the peripheral teeth of the wheel 82. A ratchet-toothed spring plunger 86 mounted on a stationary part prevents reverse rotation of the wheel 82. Each of the plungers 85 and 86 has a pin $x$ which lies in a groove $y$ when the plunger is in operative position. When it is desired to withdraw the plungers from operative position, they are pulled out and rotated to place the pins $x$ out of register with the grooves $y$.

Rigidly fixed to the end of the trunnion 6 of the drum 5 is an eccentric 87 (Fig. 1). 88 is an eccentric strap encircling the eccentric 87 and connected to one end of a rod 89 (Fig. 10). The other end of said rod is pivoted to the arm 84. It will be seen that as the drum rotates, the arm 84 will be swung to advance the wheel 82 one tooth for each revolution of the drum. The teeth of the wheel 82 may be numbered for convenience in setting the wheel in position to stop the machine after any desired number of butter-working revolutions. Said wheel may also be provided with a handle 90 for convenience in turning the wheel.

In practice the machine is operated as follows: The plungers 85 and 86 are placed in inoperative position. A suitable quantity of cream is placed in the drum 5 through the openings 5ᵃ, and the covers for said openings securely fastened in place. The dasher shelf 71 is placed in the open position as indicated in Fig. 8 by raising the hand-lever 73. The hand-lever 30 is swung downwardly to remove the locking shoulder 58 from the arm 53 and to remove the star wheel 65 from the orbit of the pin 66. The downward movement of the hand-lever 30 also shifts the working drive pinion 17 out of mesh with the intermediate gear 14 and places the churning drive gear 16 in mesh with intermediate gear 13. The hand-lever 35 is then pulled outwardly until the locking projection 37 has passed the locking shoulder 38, whereupon the hand-lever 39 drops behind the projection 37 and locks the hand-lever against the action of the spring 36. Such outward movement of the hand lever 35 causes the drive shaft 15 to be clutched to the drive pulley 31. The drive shaft 15 will, therefore, be rotated, thus causing the driver 8 to revolve. When the clutch-controlling arm or member 57 is lowered, the spring 56 immediately draws the clutch band 42 into engagement with the friction drum 41. Therefore as soon as power is communicated to the drive shaft 15 from the drive pulley 31, the drum 5 will be rotated. The speed of rotation of the drum 5 during churning is higher than that during the working operation. The churn may be stopped at any time for relieving gas or for examining the contents of the drum 5 by raising the hand-lever 39.

When the cream has been sufficiently churned, the churn is stopped by raising the hand-lever 39. The dasher shelf 71 is then placed in line with the supporting rail 72 (as shown in Fig. 9) by swinging the hand lever 73 in the appropriate direction. The churn is then again thrown into operation by means of the hand-lever 35 and stopped by means of the hand lever 39 after the drum has made one revolution, the churn being stopped when the openings 5ᵃ are in the position indicated in Fig. 9. In making said revolution, the dasher shelf 71 has brought up all of the butter above the level of the buttermilk. The buttermilk may now be drained out by removing the plug 5ᶜ (Fig. 1). When the buttermilk has been drawn off, a proper amount of water is added through one of the openings 5ᵃ. The cover is then replaced and the drum 5 rotated through several revolutions and then stopped and the wash water drained off. After adding salt, the butter is ready to be worked. The hand-lever 30 is raised into the position shown in Fig. 8, thus placing the stop shoulder 58 in the path of the arm 53. The upward movement of the hand-lever 30 also places the working drive pinion 17 in mesh with intermediate gear 14. The timing wheel 82 is then set in position to allow the desired number of working revolutions. This is done by turning the wheel 82 by means of the handle 90 until the desired number on the wheel is opposite the ratchet plunger 86. The ratchet plungers 85 and 86 are then turned so as to allow said plungers to spring into engagement with the teeth of the timing wheel. The machine is then set in operation by means of the hand-lever 35. Whenever the arm 53 stops against the shoulder 58, the pressure of the cam 52 against the arm 51 is relieved and the spring 45 is thus permitted to slacken the clutch band 42. The drum 5 thereupon stops, the drum being then in the position indicated in Figs. 8 and 9. When the drum 5 stops, the rolls 67 commence to revolve, the butter sliding off the shelf 71 and being fed by the rolls 67 through the space between said rollers, whereby the butter is worked. The mechanism is so timed that after the butter has been passed down between the rolls 67 the arm 57 is permitted to drop out of engagement with the arm 53 through the turning of the cam disk 62 caused by the action of the pin 66 on the star wheel 65. When the arm 57 is thus permitted to drop, the spring 56 tightens the clutch band 42, whereupon the drum 5 makes another revolution, in the course of which revolution the shelf 71 lifts the butter into position to be again passed between the working rolls. The drum thus makes a succession of single revolutions separated by pauses during which the butter is worked by the rolls 67. When the drum has made the number of revolutions for which the timing wheel 82 was set, the machine stops through the action of the projection 81 on the trip arm 80. If upon examination the butter is found to be of proper texture and to contain the desired percentage of moisture, the butter is removed from the drum, but if not, the working operation may be resumed and continued as long as necessary.

We would have it understood that the invention is not limited to the construction and arrangement of parts herein shown and that various changes may be made without departing from the scope of the invention as defined by the appended claims.

We claim as our invention:

1. A combined churn and butter worker having, in combination, a rotatable element, another rotatable element, a gear element connected to said other rotatable element, a driver rotatably mounted upon the axis of said first mentioned rotatable element and comprising a gear element meshing with the first mentioned gear element, said driver also comprising another gear element, a gear element with said other gear element for rotating the driver, said driver comprising a friction drum, a clutch band encircling the friction drum, said band being operatively connected to rotate with the first mentioned rotatable element, an arm arranged to tighten the clutch band, a spring arranged to release the clutch band, a cam for operating said arm, said cam being mounted to oscillate on the axis of the first mentioned rotatable element, an arm rigid with said cam, a spring tending to actuate the second mentioned arm, a locking arm arranged to hold the second mentioned arm against the action of the second mentioned spring, a notched disk for supporting the locking arm, a star wheel connected to said disk for turning the latter, a pin carried by the driver for turning the star wheel, a hand-lever for raising and lowering said disk and star wheel, and a variable-speed transmission for actuating the gear element that rotates the driver, said hand-lever controlling said transmission.

2. A combined churn and butter worker having, in combination, a rotatable element, another rotatable element, a gear element connected to said other rotatable element, a driver rotatably mounted upon the axis of said first mentioned rotatable element and comprising a gear element meshing with the first mentioned gear element, said driver also comprising another gear element, a gear element with said other gear element for rotating the driver, said driver comprising a friction drum, a clutch band encircling the friction drum, said band being operatively connected to rotate with the first mentioned rotatable element, an arm arranged to tighten the clutch band, a spring arranged to release the clutch band, a cam for operating said arm, said cam being mounted to oscillate on the axis of the first mentioned rotatable element, an arm rigid with said cam, a spring tending to actuate the second mentioned arm, a locking arm arranged to hold the second mentioned arm against the action of the second mentioned spring, a notched disk for supporting the locking arm, a star wheel connected to said disk for turning the latter, a pin carried by the driver for turning the star wheel, and a hand-lever for moving said star wheel into and out of operative relation to said pin.

3. A combined churn and butter worker having, in combination, a rotatable element, another rotatable element, a gear element connected to said other rotatable element, a driver rotatably mounted upon the axis of said first mentioned rotatable element and comprising a gear element meshing with the first mentioned gear element, said driver also comprising another gear element, a gear element with said other gear element for rotating the driver, said driver comprising a friction drum, a clutch band encircling the friction drum, said band being operatively connected to rotate with the first mentioned rotatable element, an arm arranged to tighten the clutch band, a spring arranged to release the clutch band, a cam for operating said arm, said cam being mounted to oscillate on the axis of the first mentioned rotatable element, an arm rigid with said cam, a spring tending to actuate the second mentioned arm, a locking arm arranged to hold the second mentioned arm against the action of the second mentioned spring, a rotatable member for supporting the locking arm in and out of operative relation to the second mentioned arm, and means actuated by the driver for turning said member.

4. A combined churn and butter worker having, in combination, a rotatable element, another rotatable element, means including a driver rotatably mounted upon the axis of said first mentioned rotatable element for rotating the first mentioned rotatable element and actuating the second mentioned rotatable element, said driver comprising a friction drum, a clutch band encircling the friction drum, said band being operatively connected to rotate with the first mentioned rotatable element, an arm arranged to tighten the clutch band, a spring arranged to release the clutch band, a cam for operating said arm, said cam being mounted to oscillate on the axis of the first mentioned rotatable element, an arm rigid with said cam, a spring tending to actuate the second mentioned arm, a locking arm arranged to hold the second mentioned arm against the action of the second mentioned spring, a rotatable member for supporting the locking arm in and out of operative relation to the second mentioned arm, and means actuated by the driver for turning said member.

5. A combined churn and butter worker having, in combination, a rotatable element, another rotatable element, a train of gears for rotating the first mentioned rotatable element and actuating the second mentioned rotatable element, a clutch for connecting the drum to one element of the train of gears, a clutch-controlling member, a rotatable member for supporting the clutch-controlling member, a star wheel connected to said rotatable member for turning the latter, a pin carried by one element of the gear train for turning the star wheel, a hand-lever for raising and lowering said rotatable member and star wheel, and a variable-speed transmission for actuating the gear train, said hand-lever controlling said transmission.

6. A combined churn and butter worker having, in combination, a rotatable element, another rotatable element, means including a driver rotatably mounted upon the axis of said first mentioned rotatable element for rotating the first mentioned rotatable element and actuating the second mentioned rotatable element, said driver comprising a friction drum, a clutch band encircling the friction drum, said band being operatively connected to rotate with the first mentioned rotatable element, a spring arranged to release the clutch band, an arm arranged to tighten the clutch band, a spring-actuated device for actuating said arm, a locking arm arranged to hold said device out of action, a rotatable member for supporting said holding arm in and out of operative relation to said device, and means actuated by the driver for turning said member.

7. A combined churn and butter worker having, in combination, a rotatable element, another rotatable element, means including a driver rotatably mounted upon the axis of said first-mentioned rotatable element for rotating the first mentioned rotatable element and actuating the second mentioned rotatable element, a clutch for connecting the driver to the first mentioned rotatable element, an arm arranged to throw in the clutch, a spring-actuated device for actuating said arm, a locking arm arranged to hold said device out of action, a rotatable member for supporting said holding arm in and out of operative relation to said device, and means actuated by the driver for turning said member.

8. A combined churn and butter worker having, in combination, a rotatable element, another rotatable element, means for rotating the first mentioned rotatable element and actuating the second mentioned rotatable element, a clutch for connecting the first mentioned rotatable element to the rotating means, an arm arranged to throw in the clutch, a spring-actuated device for actuating said arm, a locking arm arranged to hold said device out of action, a rotatable member for supporting said holding arm in and out of operative relation to said device, and means actuated by the driver for turning said member.

9. A churn having, in combination, a revolubly mounted element, means including a driver for rotating the element, a clutch for connecting the driver to the element, an arm arranged to throw in the clutch, a spring-actuated device for actuating said arm, a locking arm arranged to hold said device out of action, a rotatable member for supporting said holding arm in and out of operative relation to said device, and means actuated by the driver for turning said member.

10. A combined churn and butter worker having, in combination, a rotatable element, another rotatable element, means including a driver rotatably mounted upon the axis of said first mentioned rotatable element for rotating the first mentioned rotatable element and actuating the second mentioned rotatable element, a clutch for connecting the first mentioned rotatable element to the driver, a spring-actuated device for throwing in the clutch, an arm arranged to hold said device out of action, a rotatable member for supporting said arm in and out of operative relation to said device, and means actuated by the driver for turning said member.

11. A combined churn and butter worker having, in combination, a rotatable element, another rotatable element, means including a driver for rotating the first mentioned rotatable element and actuating the second mentioned rotatable element, a clutch for connecting the first mentioned rotatable element to the driver, a device for throwing in the clutch, an arm arranged to render said device inoperative, a rotatable member for supporting said arm in and out of operative relation to said device, and means actuated by the driver for turning said member.

12. A combined churn and butter worker having, in combination, a rotatable element, another rotatable element, means including a driver for rotating the first mentioned rotatable element and actuating the second mentioned rotatable element, a clutch for connecting the first mentioned rotatable element to the driver, a device for throwing in the clutch, an arm arranged to render said device inoperative, a rotatable member for supporting said arm in and out of operative relation to said device, and means for turning said member.

13. A combined churn and butter worker having, in combination, a rotatable element, another rotatable element, means for rotating the first mentioned rotatable element and actuating the second mentioned rotatable element, a clutch for connecting the first mentioned rotatable element to the rotating means, a spring-actuated device for throwing in the clutch, an arm arranged to hold said device out of action, a rotatable member for supporting said arm in and out of operative relation to said device, and means for turning said member.

14. A combined churn and butter worker having, in combination, a rotatable element, another rotatable element, means for rotating the first mentioned rotatable element and actuating the second mentioned rotatable element, said rotating and actuating means including a clutch, a spring-actuated device for throwing in the clutch, a member arranged to hold said device out of action, a rotatable member for supporting said holding member in and out of operative relation to said device, and means for turning said member.

15. A combined churn and butter worker having, in combination, a rotatable element, another rotatable element, means for rotating the first mentioned rotatable element and actuating the second mentioned rotatable element, said rotating and actuating means including a clutch, a device for throwing in the clutch, a member arranged to render said device inoperative, a rotatable member for supporting said holding member in and out of operative relation to said device, and means for turning said member.

16. A butter worker having, in combination, a roll, means for rotating said roll, said rotating means including a clutch, a spring-actuated device for throwing in the clutch, a member arranged to hold said device out of action, a rotatable member for supporting said holding member in and out of operative relation to said device, and means for turning said member.

17. A butter worker having, in combination, a roll, means for rotating the roll, said rotating means including a clutch, a device for throwing in the clutch, a member arranged to render said device inoperative, a rotatable member for supporting said holding member in and out of operative relation to said device, and means for turning said member.

18. A combined churn and butter worker having, in combination, a rotatable element, another rotatable element, a train of gears for rotating the first mentioned rotatable element and actuating said second mentioned rotatable element, a clutch connected to one element of the train of gears, a clutch-controlling member, a rotatable member for supporting the clutch-controlling member, a star wheel connected to said rotatable member for turning the latter, a revolving member for turning the star wheel, and a hand-lever for moving the star wheel into and out of operative relation to said revolving member.

19. A combined churn and butter worker having, in combination, a rotatable element, another rotatable element, a train of gears for rotating the first mentioned rotatable element and actuating said second mentioned rotatable element, a clutch connected to one element of the train of gears, a clutch-controlling member, a rotatable member for supporting the clutch-controlling member, means for turning said rotatable member, and a hand-lever for rendering said turning means operative and inoperative.

20. A butter worker having, in combination, a roll, a train of gears for rotating the roll, a clutch connected to one element of the train of gears, a clutch-controlling member, a rotatable member for supporting the clutch-controlling member, a star wheel connected to said rotatable member for turning the latter, a revolving member for turning the star wheel, and means for moving the star wheel into and out of operative relation to said revolving member.

21. A combined churn and butter worker having, in combination, a rotatable element, another rotatable element, a train of gears for rotating the said rotatable elements, a clutch for connecting the first mentioned rotatable element to one element of the train of gears, a clutch-controlling member, a rotatable member for supporting the clutch member, a star wheel connected to said rotatable member for turning the latter, a revolving member for turning the star wheel, a hand-lever for moving the star wheel into and out of operative relation to said revolving member, and a variable-speed transmission for actuating the gear train, said hand-lever controlling said transmission.

22. A combined churn and butter worker having, in combination, a rotatable element, another rotatable element, a train of gears for rotating the said rotatable elements, a clutch for connecting the first mentioned rotatable element to one element of the train of gears, a clutch-controlling member movable into and out of position to release the clutch, a hand-lever for rendering said clutch-controlling member operative and inoperative, and a variable-speed transmission for actuating the gear train, said hand lever controlling said transmission.

23. A combined churn and butter worker having, in combination, a rotatable element, another rotatable element, a train of gears for rotating the said rotatable elements, a clutch for connecting the first mentioned rotatable element to one element of the train of gears, a clutch-controlling member, a member for supporting the clutch member, a wheel connected to said supporting member for moving the latter, a revolving member for turning the wheel, a lever for moving the wheel into and out of operative relation to said revolving member, and a variable-speed transmission for actuating the gear train, said lever controlling said transmission.

24. A churn having, in combination, a clutch, a clutch-controlling member, a rotatable member for supporting the clutch-controlling member, a wheel connected to said rotatable member for turning the latter, a revolving member for turning the wheel, and a hand-lever for moving the wheel into and out of operative relation to said revolving member.

25. A combined churn and butter worker having, in combination, a rotatable element, another rotatable element, means including a driver rotatably mounted upon the axis of said first mentioned rotatable element for rotating the said rotatable elements, said driver comprising a friction drum, a clutch band encircling the friction drum, said band being operatively connected to rotate with the first mentioned rotatable element, a spring arranged to release the clutch band, an arm arranged to tighten the clutch band, a cam for operating said arm, said cam being mounted to oscillate on the axis of the first mentioned rotatable element, an arm rigid with said cam, a spring tending to actuate the second mentioned arm, and means to hold the second mentioned arm against the action of the spring.

26. A combined churn and butter worker having, in combination, a rotatable element, another rotatable element, means for rotating the said rotatable elements, said means including an element having a friction drum, a clutch band encircling the friction drum, said band being operatively connected to rotate with the first mentioned rotatable element, a spring arranged to release the clutch band, an arm arranged to tighten the clutch band, a cam for operating said arm, an arm rigid with said cam, a spring tending to actuate the second mentioned arm, and means to hold the second mentioned arm against the action of the spring.

27. A combined churn and butter worker having, in combination, a rotatable element, another rotatable element, means for rotating the said rotatable elements, said means including an element having a friction drum, a clutch band encircling the friction drum, said band being operatively connected to rotate with the first mentioned rotatable element, a spring arranged to release the clutch band, a cam and connections for tightening the clutch band, an arm rigid with said cam, a spring tending to actuate the arm, and means to hold the arm against the action of the spring.

28. A combined churn and butter worker having, in combination, a rotatable element, another rotatable element, means including a driver rotatably mounted upon the axis of said first mentioned rotatable element for rotating the said rotatable elements, said driver comprising a friction drum, a clutch band encircling the friction drum, said band being operatively connected to rotate with the first mentioned rotatable element, a spring arranged to release the clutch band, an arm and connections for tightening the clutch band, a spring tending to actuate the arm, and means to hold the arm against the action of the spring.

29. A combined churn and butter worker having, in combination, two rotatable elements, means for rotating the said rotatable elements, a clutch connecting the one of said rotatable elements to said rotating means, means for alternately throwing said clutch in and out, a hand-lever for rendering the last mentioned means inoperative, and a variable-speed transmission for driving said rotating and actuating means, said hand-lever controlling said transmission.

30. A churn having, in combination, a rotatable element, means for rotating said rotatable element, a clutch connecting said rotatable element to said rotating means, means for alternately throwing said clutch in and out, a device for rendering the last mentioned means inoperative, and a variable-speed transmission for driving said rotating means, said device controlling said transmission.

31. A churn having, in combination, a rotatable element, mechanism for rotating said element, a hand-lever and connections for determining whether the rotation of said element shall be continuous or intermittent, and a variable-speed transmission for driving the rotating means, said hand-lever controlling said transmission.

32. A combined churn and butter worker having, in combination, a rotatable element, means for rotating said rotatable element, a clutch for connecting the rotatable element to said rotating means, means for alternately throwing said clutch in and out, a hand-lever for rendering the last mentioned means inoperative, and a variable-speed transmission for driving said drum-rotating means, said hand-lever controlling said transmission.

33. A combined churn and butter worker having, in combination, a drum, butter-working means within the drum, means for rotating the drum and actuating the butter-working means, and means for automatically stopping the rotating and actuating means at a predetermined time.

34. A combined churn and butter worker having, in combination, a drum, butter-working means within the drum, means for alternately rotating the drum and actuating the butter-working means, and means for automatically stopping said rotating and actuating means after the drum has made a predetermined number of revolutions.

35. A combined churn and butter worker having, in combination, a rotatable element, another rotatable element, means for rotating said rotatable elements, a spring-actuated member for stopping the rotating and actuating means, a member for holding said stopping member out of action, and means for automatically withdrawing said holding member.

36. A combined churn and butter worker having, in combination, a rotatable element, another rotatable element, means for alternately rotating said elements, a spring-actuated member for stopping said rotating and actuating means, a member for holding the spring-actuated member out of action, and means actuated by the first mentioned rotatable element for withdrawing said holding member.

37. A churn having, in combination, a drum, means for rotating the drum, and drum-actuated means for automatically stopping the drum-rotating means at a predetermined time.

38. A churn having, in combination, a drum, means for intermittently rotating the drum, and means for automatically stopping said drum-rotating means after the drum has made a predetermined number of revolutions.

39. A churn having, in combination, a rotatable element, means for rotating the rotatable element, a spring-actuated member for stopping the rotating means, a member for holding said stopping member out of action, and means for automatically withdrawing said holding member.

40. A churn having, in combination, a rotatable element, means for intermittently rotating the rotatable element, a spring-actuated member for stopping said rotating means, a member for holding the spring-actuated member out of action, and means actuated by the rotatable element for withdrawing said holding member.

In testimony whereof we have hereunto set our hands.

THEODORE L. VALERIUS.
OLAF LARSEN.

Correction in Letters Patent No. 1,335,624.

It is hereby certified that in Letters Patent No. 1,335,624, granted March 30, 1920, upon the application of Theodore L. Valerius and Olaf Larsen, of Fort Atkinson, Wisconsin, for an improvement in "Actuating Mechanism for Combined Churns and Butter-Workers," an error appears in the printed specification requiring correction as follows: Page 5, line 114, claim 5, for the word "drum" read *first mentioned rotatable element;* and that the said Letters Patent should be read with this correction therein that the same may conform to the record of the case in the Patent Office.

Signed and sealed this 20th day of April, A. D., 1920.

[SEAL.]

M. H. COULSTON,
*Acting Commissioner of Patents.*

Cl. 259—84.